(12) United States Patent
Nascimento da Silva et al.

(10) Patent No.: US 12,229,672 B2
(45) Date of Patent: Feb. 18, 2025

(54) DETECTING DOMAIN CHANGES WITH DOMAIN CLASSIFIERS IN AUTONOMOUS VEHICLES

(71) Applicant: EMC IP Holding Company LLC, Hopkinton, MA (US)

(72) Inventors: Pablo Nascimento da Silva, Rio de Janeiro (BR); Hugo de Oliveira Barbalho, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 791 days.

(21) Appl. No.: 17/451,778

(22) Filed: Oct. 21, 2021

(65) Prior Publication Data

US 2023/0128919 A1   Apr. 27, 2023

(51) Int. Cl.

| | |
|---|---|
| *G06V 10/00* | (2022.01) |
| *G06F 18/214* | (2023.01) |
| *G06F 18/241* | (2023.01) |
| *G06N 3/08* | (2023.01) |
| *G06V 10/75* | (2022.01) |

(52) U.S. Cl.
CPC ........... *G06N 3/08* (2013.01); *G06F 18/2155* (2023.01); *G06F 18/241* (2023.01); *G06V 10/751* (2022.01)

(58) Field of Classification Search
CPC ............ G06N 3/08; G06N 3/02; G06N 3/042; G06N 3/045; G06N 3/047; G06N 3/082; G06N 3/092; G06N 3/0475; G06N 3/0454; G06N 3/0464; G06V 10/751; G06V 10/82; G06V 10/774; G06V 20/56; G06F 18/2155; G06F 18/241; G06K 9/6202; G06K 9/6259; G06K 9/6268

See application file for complete search history.

(56) References Cited

U.S. PATENT DOCUMENTS

| | | | |
|---|---|---|---|
| 10,970,589 B2 * | 4/2021 | Bousmalis | G06F 18/241 |
| 10,977,783 B1 * | 4/2021 | Jaipuria | G06V 10/70 |
| 11,100,372 B2 * | 8/2021 | Jaipuria | G06N 3/084 |
| 11,150,663 B2 * | 10/2021 | Shirvani | G06V 20/56 |
| 11,235,785 B2 * | 2/2022 | Pazhayampallil | G01S 17/931 |
| 11,250,329 B2 * | 2/2022 | Karras | G06N 3/047 |

(Continued)

OTHER PUBLICATIONS

Ganin, Y., Ustinova, E., Ajakan, H., Germain, P., Larochelle, H., & Laviolette, F. (2016). Domain-adversarial training of neural networks. Journal of Machine Learning Research 17 (59), 1-35.

(Continued)

*Primary Examiner* — Amir Alavi
(74) *Attorney, Agent, or Firm* — Workman Nydegger (57) ABSTRACT

One example method includes gathering, by a domain adversarial neural network model deployed in an autonomous vehicle operating in a domain, a dataset that comprises unsegmented and unlabeled image data about the domain, sampling the dataset to create an adapted domain dataset, detaching a domain classifier from the domain adversarial neural network, using the domain classifier as a domain change detector model to predict a class of the unsegmented and unlabeled image data in the adapted domain dataset, and based on the class, either: determining that the domain is changed or is unknown; or, determining that the domain has not changed.

20 Claims, 6 Drawing Sheets

(56) References Cited

U.S. PATENT DOCUMENTS

| | | | |
|---|---|---|---|
| 11,610,435 B2* | 3/2023 | Karras | G06V 10/7747 |
| 11,667,301 B2* | 6/2023 | Misra | G08G 1/0145 |
| | | | 701/23 |
| 11,836,597 B2* | 12/2023 | Patney | G06T 7/0008 |
| 11,840,258 B2* | 12/2023 | Shalev-Shwartz | ............ |
| | | | B60W 40/105 |
| 2023/0128919 A1* | 4/2023 | Nascimento da Silva | ............ |
| | | | G06N 3/047 |
| | | | 706/15 |
| 2023/0158679 A1* | 5/2023 | Wen | B25J 9/161 |
| | | | 700/259 |

OTHER PUBLICATIONS

Trifiro, M., & Smith, J. (2019). Seagate. Retrieved from Seagate: https://www.seagate.com/www-content/enterprise-storage/it-4-0/images/Data-At-The-Edge-UP1.pdf.

* cited by examiner

DETECTING DOMAIN CHANGES WITH DOMAIN CLASSIFIERS IN AUTONOMOUS VEHICLES

FIELD OF THE INVENTION

Embodiments of the present invention generally relate to image-based decision making processes performed by autonomous entities. More particularly, at least some embodiments of the invention relate to systems, hardware, software, computer-readable media, and methods for detecting, based on an image analysis, changes in a domain in which an autonomous entity is operating.

BACKGROUND

Autonomous vehicles (AVs) rely on a large variety of machine learning applications to work correctly. One of these applications is image segmentation to support decision-making processes. Image segmentation can be performed by training large Deep Neural Network (DNN) models. However, these types of models are susceptible to changes in the data used for training. That is, if the domain of the input changes, the model may suffer a performance penalty.

Even though Domain Adversarial Neural Networks (DANN) have been successfully applied to adapt DNNs to different domains, determining when to activate the adaptation process is still challenging. Some particular problems include: (i) detecting changes in the application domain; (ii) providing a detection algorithm that is suitably lightweight; and, (iii) dealing with the complexity of image datasets, for example, it is challenging to compare two visual images. A more detailed description of some current problems follows.

Particularly, there are a variety of challenges involved in addressing the problem of detecting domain changes, or 'drift,' for adapting a DNN model for segmenting images collected by vehicles and other entities on edge nodes under a high mobility scenario. For example, current approaches do not provide the ability to reliably and accurately detect changes in the application domain. For example, different applications associated to autonomous vehicles are supported by Machine Learning models like image segmentation. Most of these applications, such as line detection for example, are sensitive to the current environment that the vehicle is passing by or through. Thus, the performance of an image segmentation model deployed in an autonomous vehicle should be resilient to domain changes. However, the problem of detecting changes in the application domain while a car is driving, or while other autonomous actions are being performed in a domain, remains unresolved.

Another current challenge concerns procedures for detecting changes in the application domain. Particularly, devices such as autonomous vehicles typically have hardware limitations, such as limited processing power and data storage, that may impair their ability to perform various operations needed for detecting changes in an application, or operating, domain.

A final example of a problem concerns the fact that detection of domain changes may require the ability to deal with large and complex image datasets. In particular, images have structured elements, which may make it difficult for an image to be easily compared with other images. Thus, a challenge is presented in any attempt to detect, by examination of image segmentation models, when a domain has changed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to image-based decision making processes performed by autonomous entities. More particularly, at least some embodiments of the invention relate to systems, hardware, software, computer-readable media, and methods for detecting, based on an image analysis, changes in a domain in which an autonomous entity is operating.

In general, example embodiments of the invention embrace approaches to the problem of detecting domain changes in image segmentation applications. Some example approaches may address this problem by leveraging part of a DANN model trained by an adaptation process, devising a lightweight framework for detecting if the application domain has changed, and detecting any underlying differences between two image datasets.

In more detail, an example embodiment may begin with training of DANN models. To this end, a large dataset of images may be collected and labeled, possibly offline from the operation of an autonomous entity. An image segmentation neural network may then be trained using this labeled dataset. In some embodiments, the model may be trained on a cloud or data center that possesses substantial computational resources such as processing resources and storage resources. As collecting a large dataset with images from all possible kinds of roads, streets, weather, and other characteristics is a challenging task, embodiments of the invention may use an adaptation procedure to adapt the model to new environments. Next, the model may be deployed on vehicles or other autonomous entities and may begin collecting unlabeled data from the operating environment, or domain. When a change in the environment is detected during the deployment and/or collection processes, an adaptation process may be instantiated, and the DNN model updated to reflect the change in the environment.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that embodiments may help to avoid problems with the operation of an autonomous entity when the autonomous entity encounters changes in its operating domain. Embodiments may enable an autonomous entity to modify its behavior on-the-fly in response to changes in the operating environment of the autonomous entity. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

A large variety of applications employ image segmentation to support the decision-making process. For example, an algorithm that automatically identifies the human body parts in magnetic resonance imaging helps doctors identify diseases. A convolutional neural network (CNN) is a typical approach to perform image segmentation. This type of algorithm is data-hungry and needs pixel-wise annotation of the images for (re-)training a CNN model. These neural networks are also very deep, with some neural networks having more than 100 layers, such as ResNet-101 for example.

Image segmentation may also be used as the input of other algorithms, as is the case of autonomous vehicles (AV), where the segmentation is later used by the car to decide how to drive on a given road. One characteristic that differentiates AV applications from others is the high mobility of AVs, and the massive amount of image data generated by just one vehicle. For example, an autonomous vehicle could produce four terabytes of data per day, and there could be 200 million AVs on the roads in the next few years (see, e.g., https://www.seagate.com/www-content/enterprise-storage/it-4-0/images/Data-At-The-Edge-UP1.pdf). Thus, enormous amounts of image data may be generated by AVs and other autonomous entities.

Another challenge presented by AV applications is the difficulty in generalizing a model to different and always changing environments. For example, a model trained on California streets in winter must be accurate in streets and roads worldwide, which may experience varying weather conditions. Given the dynamism of an AV, the need to have a CNN for image segmentation that adapts the neural network according to environmental changes has arisen. Domain Adaptation Neural Networks (DANN) have been used for this task. This approach leverages unlabeled image datasets along with a small labeled dataset to retrain the model to new environments. However, and as noted earlier herein, various challenges remain.

For example, there is the problem of how to detect when the domain has changed, so that a domain adaptation procedure may be begun. This kind of situation may be addressed by the comparison of data distributions. In the case of image segmentation however, building such data distributions is difficult since the source and target datasets are huge and the data structure behind images are complex. Put another way, it is difficult and complicated to compare the data distribution of two image datasets.

Thus, there are various challenges to detection of domain changes in image segmentation algorithms in the AV domain. Such challenges may be addressed by example embodiments. For example, embodiments may provide for a detection method that may be capable of detecting changes in the application domain while an AV or other vehicle is operating in the application domain. As well, embodiments may provide a procedure for detecting changes in the application domain that is relatively lightweight so as to accommodate the limited processing and storage resources that are typical of some AVs. Finally, embodiments may implement a procedure for detecting changes that is able deal with the large size and complexity of image datasets.

B. Background

Following is a discussion of various concepts that may facilitate a better understanding of example embodiments of the invention. This discussion is not intended to limit the scope of the invention in any way.

In general, at least some example embodiments are directed to addressing the challenges posed by deep neural networks for image segmentation and its adjustment to domain. Additionally, example embodiments may deal with resource and privacy constraints when training a DNN for image segmentation in autonomous driving applications. Thus, a discussion of deep neural network training, domain adaptation and Domain Adversarial Neural Networks (DANN), and image segmentation for autonomous vehicle, may be helpful in illuminating aspects of various example embodiments of the invention.

B.1 Deep Neural Network Training

Training of machine learning models relies on training algorithms, usually supported by optimization. This situation is the same for deep neural networks, which relies on the famous back propagation algorithm and an optimization algorithm, Stochastic Gradient Descent (SGD) being the most prominent one. Before initialization, one network topology of neurons and interconnecting weights must be chosen. This topology will determine how the calculations will flow through the neural network. After that, an initialization must be performed, which will set the weight values to some random or predefined values. Finally, the training algorithm will separate batches of data and flow them through the network. Afterward, one step of back propagation occurs, which will set the direction of movement of each of the weights through the gradients. Finally, the weights will move by a small amount, ruled by the algorithm learning rate. This process will go on for as many batches as necessary until all training data is consumed. This greater iteration is called an epoch. The training will go on until a predefined number of epochs is reached, or any other criteria are met, for example, there has been no significant improvement observed over the last p epochs.

B.2 Domain Adversarial Neural Network (DANN)

Domain Adaptation (DA) is a type of Transfer Learning (TL) where the source and target tasks are the same, with a shift between source and target domain distributions. In the scenario of image segmentation for connected autonomous entities such as AVs, for example, the shift between domains means that the model for the source domain, that is, the model trained in the factory using general data, has a decrease in the accuracy when that model is applied on a new and previously unseen target domain such as, for example, a new city, road type, weather conditions, or even a combination of city and weather conditions. Performing this type of adaptation presents a significant challenge, since the neural network requires large amounts of labeled data for training.

The Domain Adversarial Neural Network (DANN) borrows the concept of adversarial training to adapt a neural network to a new domain using a combination of labeled data and unlabeled data. This makes the adaptation process more feasible, since there is no need for labeling data during the adaptation procedure.

The DANN model may include three fundamental parts: (i) a feature extractor that learns how to extract features that are discriminative and invariant between the source and target domains; (ii) a label predictor, responsible for image segmentation in this case, which is trained only on labeled data; and (iii) a domain classifier. The domain classifier may be responsible for learning which image comes from the source domain, that is, the labeled data, and which image comes from the target domain, that is, for example, the unlabeled data collected as an AV travels along a road. This information may be used to improve the feature extractor. Training this part of the model requires labeled data from the source and the unlabeled data, collected by the vehicle or other autonomous entity.

Figure 1:
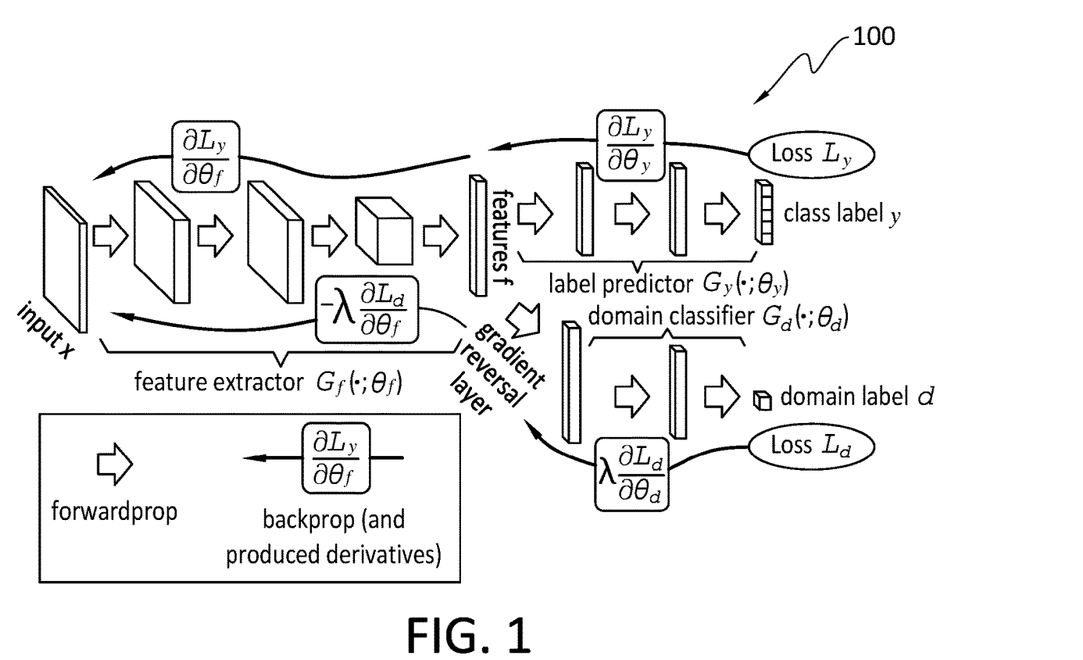
FIG. 1 discloses an original Domain Adversarial Neural Network (DANN) model.

With attention now to FIG. 1, there is disclosed an example Domain Adversarial Neural Network (DANN) model 100. The prediction loss and the domain loss are, respectively:

$$L_y^i(\theta_f, \theta_y) = L_y(G_y(G_f(x_i; \theta_f); \theta_y), y_i)$$

$$L_d^i(\theta_f, \theta_d) = L_y(G_d(G_f(x_i; \theta_f); \theta_d), d_i)$$

where, $G(x, \theta)$ is a neural network applied to a dataset x with parameters $\theta$, $y_i$ is the correct label of instance $x_i$, and $d_i$ is the correct domain label of instance $x_i$. So, training the DANN consists in optimizing the following function:

$$E(\theta_f, \theta_y, \theta_d) = \frac{1}{n}\sum_{i=1}^{n} L_y^i(\theta_f, \theta_y) - \lambda\left(\frac{1}{n}L_d^i(\theta_f, \theta_d) + \frac{1}{n'}L_d^i(\theta_f, \theta_d)\right)$$

where, n is the number of instances in the source dataset, and n' is the number of instances in the target dataset. Usually, n'>>n. Note that the optimization function may be calculated over two distinct datasets with different sizes.

To summarize then, the three parts may be trained together when there is a need to adapt the model to a new environment. That is, there may be stored, inside the car or other autonomous entity, a large amount of labeled data that were used to train the initial model, as well as the even bigger dataset of collected unlabeled data. Storage of such large amounts of data would require a significant number of storage devices inside a single car, which is an impractical approach. Additionally, training with large amounts of data is very time-consuming, making the adaptation impractical.

C. Aspects of Some Example Embodiments

In general, example embodiments embrace, among other things, a method for detecting an application domain change in an application of image segmentation for autonomous vehicles. As contemplated herein, an application domain, or environment, is considered to have changed when the data used to train the deep neural network model (DNN) becomes different, such as materially different, from the data that was captured by the vehicle camera in the prediction stage.

A material change in the domain can bring problems, which may be significant, such as a decrease in the accuracy of the model that could potentially lead to malfunctions of the system and cause accidents. For example, if a vehicle is expecting, based on the training data, an exit off a highway, but the exit has been removed, that is, the domain has materially changed, and the vehicle does not have information about the domain change, the vehicle may simply run off the road where the exit used to be. Thus, a material change in a domain includes a change that requires a modification to the operation of an AV when the AV is operating in that domain. On the other hand, an example of a non-material change in a domain, which may or may not be processed by embodiments of the invention, is any change that may not impact or change, or require a change to, the operation or behavior of an AV operating in that domain. For example, the addition of a restaurant sign along the side of the road is only informational in nature and, as such, may not affect the operation of an AV operating in the domain where that sign is located.

Domain Adversarial Neural Networks (DANN) may be used to address the problem of retraining the model to new unseen environments without labeling the image dataset for the new environment. Also, adapting a Neural Network model to the new environment may have to be performed quickly in the autonomous vehicle scenario, due to the high mobility aspect of the application, that is, due to the speed with which the vehicle is moving through its domain. If the adaptation of the model fails to keep pace with the vehicle movements, accidents and other problems may occur.

Further, there is still a challenge that this kind of adaptation procedure faces, namely, how to decide the right time to turn on the adaptation procedure. Note that this is even more challenging when dealing with image datasets since the comparisons between images do not follow a simple pattern, and because the datasets to be compared may be quite large and beyond the capability of the autonomous vehicle to perform.

C.1 Overview of Some Example Embodiments

In view of such considerations, example embodiments embrace, among other things, a mechanism for detecting the changes in the environment by leveraging part of the DANN network originally used for domain classification. This part of the network makes the feature extractor learn discriminative and invariant features between the old and new environments. Thus, the domain classifier may be updated further to identify the subsequent domain change. More particularly, embodiments may: leverage part of a DANN network already trained by the adaptation process; define and implement a lightweight framework for detecting if the application domain has changed; and, detect the underlying differences between two image datasets.

Figure 2:
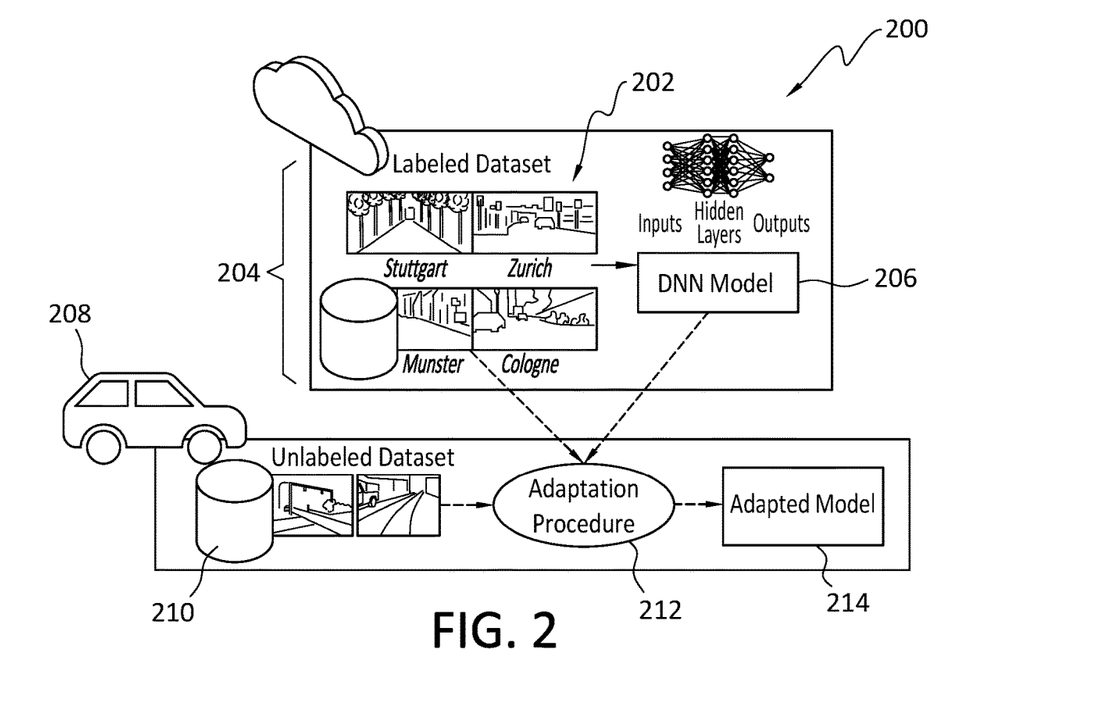
FIG. 2 discloses an overview of the division of training tasks.

With reference now to the configuration 200 of FIG. 2, an example embodiment of the invention may be described as follows. First, to train a DNN model (not shown in FIG. 2), a large dataset 202 of images 204 may be collected and labeled. As the data collection and labeling may take a significant amount of time, these processes may be performed offline with respect to other elements of the training and adaptation methods. A DNN model, such as a large image segmentation neural network for example, may be trained using this labeled dataset. The DNN model may be trained on a cloud or data center that has significant computational resources available. Note that collecting a large dataset with images 204 from all possible kinds of roads, streets, weather, and other characteristics, is a challenging task. Thus, example embodiments of the invention may use an adaptation procedure to adapt the DNN model 206 to new environments, or domains, rather than, for example, building a new DNN model each time a domain change is expected or encountered. FIG. 2 discloses an example of this process. Next, the DNN model 206 may be deployed on one or more vehicles 208 and the vehicle 208 may start collecting unlabeled data 210 from the environment in which the vehicle 208 is operating. When a change in the environment is detected during the gathering of unlabeled data, embodiments of the invention may begin an adaptation process 212, and the DNN model may be updated so as to define an adapted DNN model 214 that may be deployed to, and used by, the vehicle 208. In some embodiments, the adaptation process 212 may be performed by/at the vehicle 208. Further, in some embodiments, the adaptation process 212 may comprise the use of a Domain Adversarial Neural Network (DANN) to adapt the DNN model 206 to a different, or changed, domain.

Briefly then, the adaptation process 212 may be performed in response to detection of a change in the environment or domain in which an autonomous entity is operating, or is expected to operate. An instance of the adaptation process 212 may be performed at each vehicle 208 that needs the adapted model. Alternatively, an adapted model may be generated at a central location and propagated to each of a group of vehicles 208.

Figure 3:
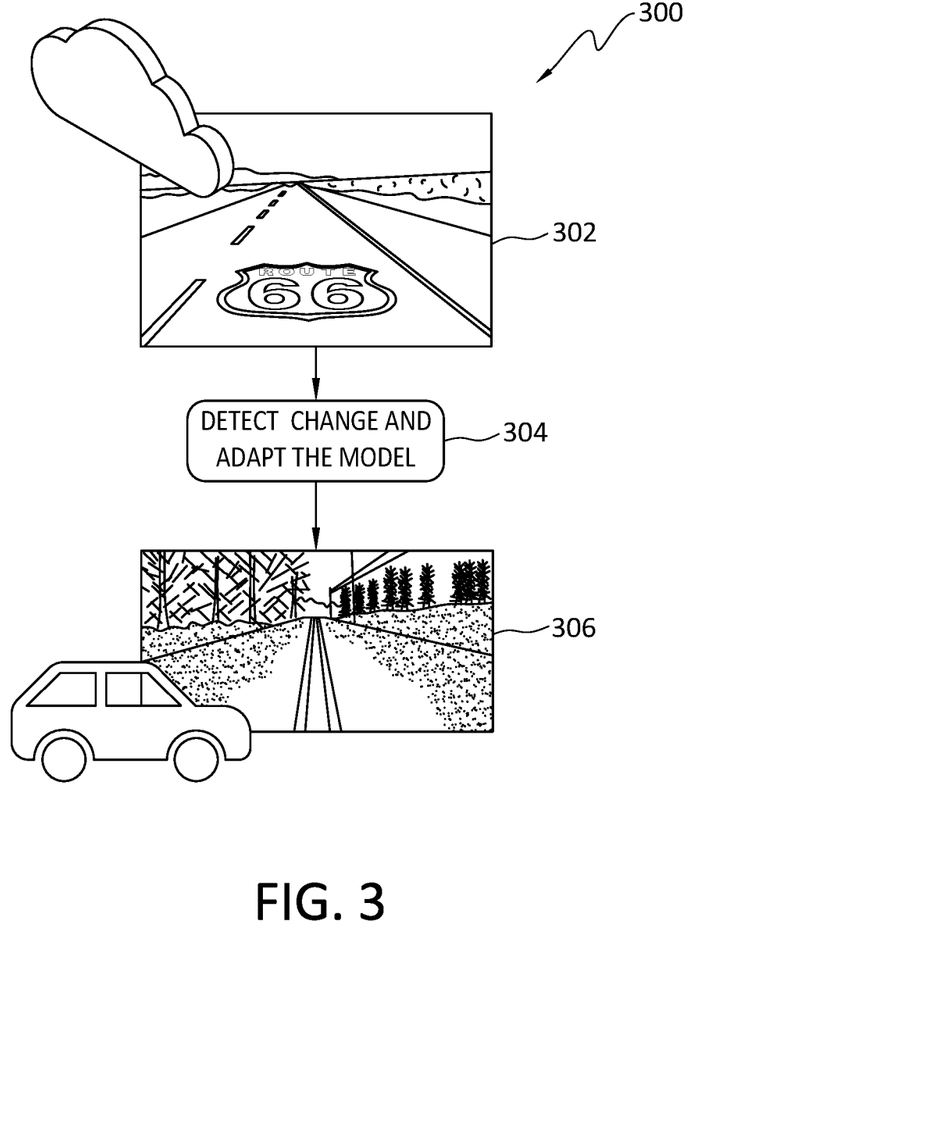
FIG. 3 discloses detection of domain changes when a model is trained on sunny data and the model is used on snowy roads.

Thus, example embodiments may include a method for detecting when a given model has drifted and needs to be adapted to include one or more features of a new or modified domain. The example 300 of FIG. 3 is illustrative. Initially, a model may be trained using the gathered domain data 302 that indicates sunny conditions and a clear road. The domain data 302 may have been gathered by an AV operating in its domain, and/or may have been gathered by another entity. Thus, the data used for initial training of the model may, but need not necessarily, have been gathered by the AV where the model will reside and be used.

The domain may be, for example, a road that is being traveled, or will be, by an autonomous vehicle. However, this is not required. More generally, and continuing with the non-limiting example of roads, the domain may be any road whose conditions may vary, such as due to seasonal changes for example, such that the seasonal conditions should be accounted for by a model in an AV. Thus, a road in California may be used to train a model for clear and sunny conditions, and a road in Norway may be used to train the same model for snowy conditions. Even though the roads, or domains, are in different geographical locations, the cumulative data from the California road and the Norway road can be employed by a single instantiation of the model to guide how an AV will operate when confronted with sunny, or snowy, conditions on any given road(s).

Subsequent to training of the model, a change in weather conditions, that is, a change in the domain, may be detected 304 by the autonomous vehicle and/or another sensor, such as a sensor in the area where the change is occurring or has occurred. The change may be, for example, detection of snowy conditions 306 on the road. In response to detection of the change in the domain, which change may be communicated to the autonomous vehicle in the case where the autonomous vehicle does not, itself, detect the change, the model may be adapted 304 to reflect the change.

In response to the adaptation 304 of the model, and/or as dictated by the adapted model, the AV operating in the changed domain may modify, in real time, its behavior. This modification may or may not occur automatically. For example, the model may indicate to the AV that the AV should slow down when the road is covered with snow. The model may control operation of the AV, such as by slowing the AV on a snowy road, and/or the AV may modify its behavior in response to cues or input received by the AV from the model, such as by slowing down when the model indicates a snowy road. Additionally, or alternatively, when a domain change is detected, the model may simply be updated to reflect the change in the domain, with no real time modification to the operating behavior of the AV. A copy of the updated model may be communicated from the AV to other AVs, a cloud site, and/or to other entities.

C.2 Detachment and Retraining of Domain Classifier to Form DCD

After model deployment inside an autonomous entity such as an AV, an embodiment of the invention may start collecting data from the streets/roads as the AV operates in a domain. This dataset may unlabeled since, in some embodiments, the process of labeling the data may be performed in a cloud computing environment. Note that, for the execution of an adaptation process, such as the first adaptation process performed on the model, when a predefined number of images is collected, the adaptation process may begin. Subsequently, the DANN model may be trained and adapted to the initial environment using the data initially gathered by the AV. Thus, some example embodiments may leverage part of the trained DANN model to check if the domain has changed, so that adaptation of the DANN model to reflect changes in the domain may begin.

In some example embodiments, and as discussed in more detail elsewhere herein, one or more elements of the trained DANN model, such as the domain classifier part of the trained DANN model, may be detached from the DANN model and used as a domain change detector (DCD). The DCD model may comprise a feature extractor of the DANN model and a domain classifier of the DANN model as shown, for example, in the DANN 100 in FIG. 1. The DCD model may be a copy of the original model. Thus, both the DANN and DCD may reside onboard the AV.

Note that the domain classifier, as trained in the adaptation process, may not be able to be used to detect domain changes because the training may force the DANN model to be fooled so that a good label predictor can be trained. Then, to mitigate this, the DCD model may be retrained for e epochs using both labeled data, that is, the data from the original domain dataset, available in the cloud and partially copied to the car, and an adapted domains dataset, that is, a collection of images from previous domains, collected by the car. The adapted dataset may be formed by samples of the data collected by the car during the last t iterations, that is, the adapted dataset may contain samples from the last t domains from which the DANN model was adapted. This process may make the DCD model suitable for identification of images that are different from those used by the original model and the previous adaptation of the model. An example of a process for detaching and re-training a DCD model is shown in FIG. 4.

Figure 4:
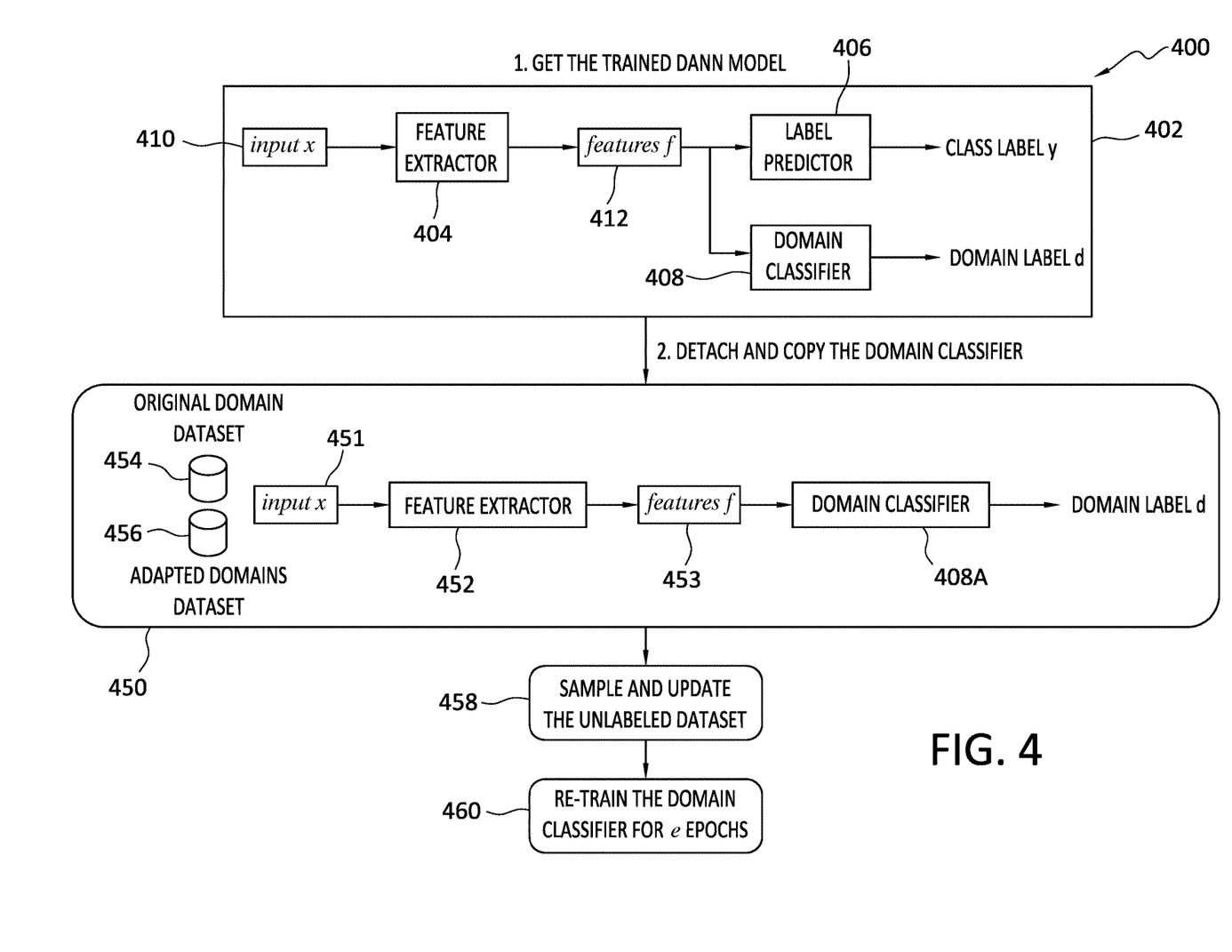
FIG. 4 discloses an example configuration and process for detaching and re-training a Domain Change Detector (DCD).

As shown, the example scheme 400 in FIG. 4 may include a trained DANN model 402 that may include, for example, a feature extractor 404, label predictor 406, and domain classifier 408. The feature extractor 404 may receive input 410, such as image data gathered by an AV for example and/or image data provided from another source, such as a cloud site for example. The feature extractor 404 may then extract one or more features 412 from the input 410. The features 412 may then be provided to the label predictor 406 and/or to the domain classifier 408. The label predictor 406 may generate, and assign to the features 412, a class label, and the domain classifier 408 may generate, and assign to the features 412, a domain label.

In embodiments of the invention, the domain classifier 408 may be detached from the DANN model 402, and copied. The copy 408A of the domain classifier 408 may be incorporated as an element of the configuration 450, which may also include a feature extractor 452, and may comprise, or at least have access to, an original domain dataset 454 that may comprise labeled data and an adapted domain dataset 456 that may comprise unlabeled data. In general, and as shown in FIG. 4, the feature extractor may receive, as input 451, data from one or both of the original domain dataset 454 and the adapted domain dataset 456, from which input 451 one or more features 453 may be extracted by the feature extractor 452. The extracted features 453 may be fed to the domain classifier 408A which may assign a domain label, identifying a particular domain, to the features 453.

With continued reference to the example of FIG. 4, unlabeled data may be sampled, from the adapted domain dataset 456 for example, and updated 458. As noted earlier, the adapted domain dataset 456 may comprise a collection of images from one or more previous domains, or versions of domains, collected by an autonomous entity such as an AV. In some particular embodiments, the adapted domain dataset 456 may comprise samples of data collected, such as by an AV, during the last t iterations, that is, the last t domains from which the DANN model was adapted. Finally, the domain classifier 408A may be retrained 460 for e epochs.

Figure 5:
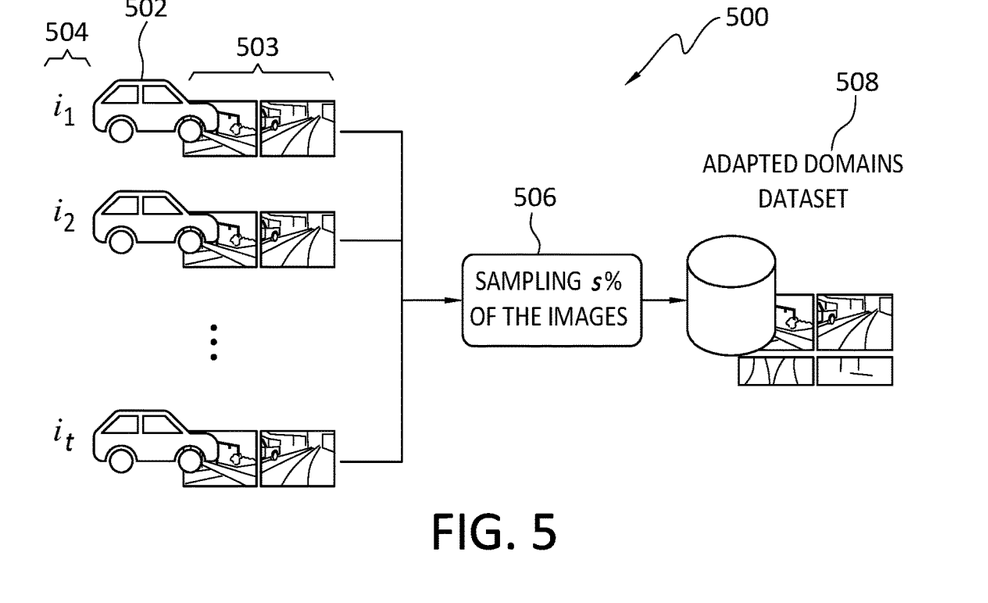
FIG. 5 discloses generation of an adapted domains dataset from the last t iterations.

In more detail, and with reference now to the example of FIG. 5, an example process for generating an Adapted Domains Dataset, such as the adapted domains dataset 456 for example, may proceed as follows. As shown in the configuration 500, a vehicle 502 may gather domain data 503, that is, unlabeled data, at each of t points in time, or iterations, 504, where t can be any positive integer.

After each iteration 504 of the application of the adaptation procedure, the method may store, in the vehicle storage, the unlabeled dataset used in the adaptation procedure. Data from the last t runs of the procedure may be stored. Thus, the parameter t may be used in two ways. First, the parameter may provide, or imply, a limit to the amount of the past data to be stored since, in some example embodiments, only data from the last t runs is stored. Second, the parameter t may indicate, and thus limit, the number of domains that the method will try to identify.

Next, the method may obtain samples 506 of the domain data 503 that has been gathered by the vehicle 502. The sample amounts, or sample sizes, may be determined experimentally and/or by any other suitable approach. In some example embodiments, the sample taken may comprise s % of the images from all the previous t datasets. For example, if s=12, 12% of the images may be taken from each dataset, or 12% taken from all the datasets considered together as a whole. In the latter case, the respective amount taken from each individual set may vary from one dataset to another, and may or may not be 12%. Finally, the samples may be combined together to form an adapted domains dataset 508 that may be used, together with an original domain dataset, to train or re-train, as the case may be, a DCD model.

C.3 Use of DCD Model to Detect Domain Changes

Figure 6:
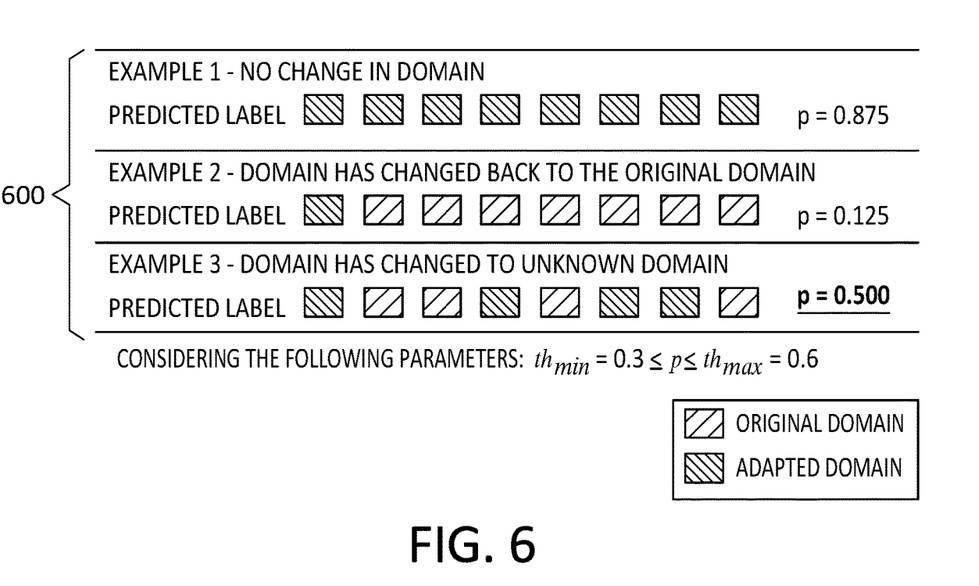
FIG. 6 discloses examples for detecting if a domain has changed to an unknown domain.

With reference next to FIG. 6, details are provided concerning the use of a DCD model to detect domain changes. Particularly, FIG. 6 discloses detecting when a domain has changed to an unknown domain ($th_{min} \leq p \leq th_{max}$).

During its operation in a domain, such as streets in a city for example, a vehicle may collect data concerning the domain. When an adequate amount of data has been collected by the vehicle, the DCD model may be used to predict the correct class of the collected dataset, that is, whether or not the images in the dataset belong to the original domain, or whether the images in the dataset indicate a new or unknown domain. The data collection process may stop when a pre-defined number of images, which will form an unlabeled dataset, is collected. This number of images can be defined on a case-by-case basis. Note that the predictions for the collected data using the DCD model may be binary, that is, either a collected image is from, or is the same as an image from, the original domain that was used to train the first model, or the collected image is from an adapted domain, that is, the image is similar to, or the same as, images included in a previous, adapted domain. When the DCD makes predictions, or domain classifications, outside of a specified range, or above/below specified values, an adaptation procedure may be instantiated.

For example, if the number of model predictions for images from the adapted domain is lower than a selectable minimum threshold ($th_{min}$), that indicates that the collected data, or images, are close to, or the same as, images from the original domain. On the other hand, if the number of model predictions for images from the adapted domain is higher than a selectable maximum threshold ($th_{max}$), that indicates no change in the domain, that is, the images in the sample are from a domain previously adapted by the process.

If the number p of model predictions for images from the adapted domain, which number may be expressed as a percentage of the total number of images in the adapted domain, is between the tunable values $th_{min}$ and $th_{max}$, that indicates that the images were collected from an unknown domain and, accordingly, an adaptation procedure may be instantiated in response to this determination. The examples 600 of FIG. 6 are illustrative.

In Example 1 of FIG. 6, all but 1 of the 8 images in the data sample have been identified as being the same as, or having come from, the adapted domain. That is, the sampled images indicate no change in the domain in which the AV that collected the images is operating. Thus, the p value is (8−1)/8, or 0.875, which exceeds $th_{max}$.

In Example 2 of FIG. 6, 7 of the 8 images in the data sample have been identified, that is, classified, as being the same as, or having come from, the original un-adapted domain. That is, this data sample indicates that that the domain from which the images were taken has changed back to the original domain. Thus, the p value for this set of images is (8−7)/8, or 0.125, which is below $th_{min}$.

Finally, in Example 3 of FIG. 6, 4 of the 8 images in the data sample have been identified, that is, classified, as being the same as, or having come from, the original un-adapted domain, while the remaining 4 images have been classified as coming from the adapted domain. Thus, the p value for this set of images is (8−4)/8, or 0.5, which is between $th_{min}$ and $th_{max}$. This p value indicates that the domain from which the images were taken is an unknown domain, that is, the adapted domain has changed to an unknown domain and, as such, an adaptation process may be instantiated for the unknown domain.

As the Examples 600 of FIG. 6 thus collectively illustrate, example embodiments may provide a method, based on data sampling of one or more datasets, for determining whether or not changes have occurred in an operating domain of an AV entity, and that determination may form the basis for instantiation of an adaptation process which may update a domain to reflect the changes. The materiality of the changes may also be taken into account when determining whether a domain should be subjected to an adaptation process. For example, if changes have occurred, but are not material, and/or are not sufficiently numerous, the domain may not be subjected to an adaptation process.

D. Example Methods

Figure 7:
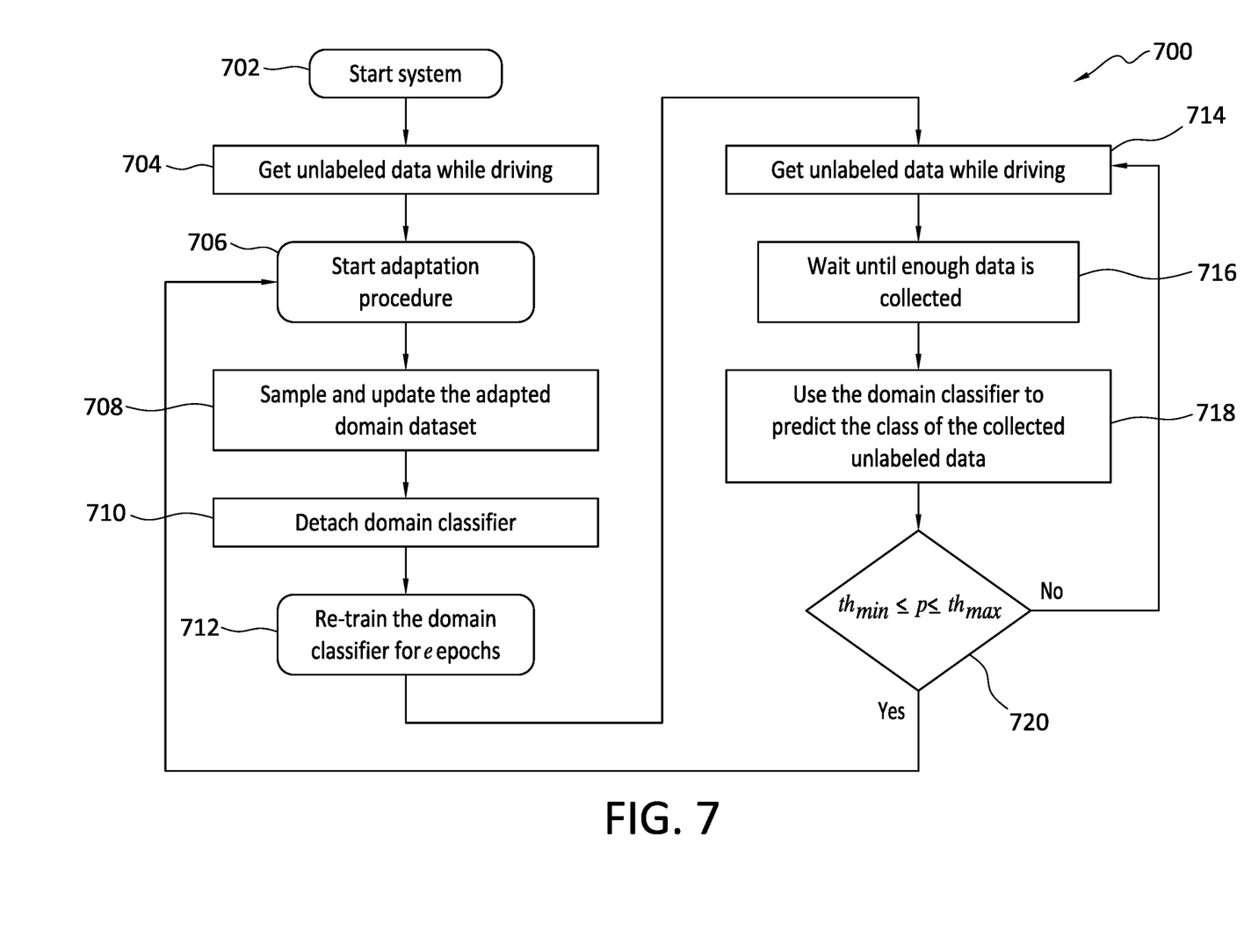
FIG. 7 discloses a method according to some example embodiments.

It is noted with respect to the example method of FIG. 7 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 7, the method 700 may begin at 702 when an AV or other autonomous entity begins operating in a domain. As the AV operates in the domain, the AV may collect 704 unsegmented, and unlabeled, images. These images may be collected 704 with devices such as cameras, and video-cameras, but no particular image collection system or device is required.

A domain adaptation procedure may be started 706 during or after collection 704 of the images. The domain adaptation procedure 706 may include sampling and updating an adapted domain dataset 708, detaching a domain classifier from a DANN 710, and re-training a domain classifier of a DANN for e epochs 712.

After completion of an iteration of the domain adaptation procedure 706, the AV may start, or continue, to collect 714 unlabeled data while operating in the domain. Next, a determination 716 may be made as to when a sufficient amount of data has been collected as to enable a classification process 718 to be performed. What constitutes a sufficient amount of data is tunable, depending for example on the particular AV, the domain in which the AV operates, and/or other considerations.

More particularly, the classification process 718 may involve the use of a domain classifier to predict the class of the collected 714 unlabeled data. That is, the domain classifier may operate to identify whether a particular image, or group of images are from an original domain, an adapted domain, or an unknown domain. To this end, and as discussed in connection with the example of FIG. 6, the domain classifier may determine 720 a p value for each image in a set of sample images taken from collected unlabeled data. If the p values indicate that the domain is changed or unknown, the method 700 may return to 706. On the other hand, if the p values indicate that there has been no change to the domain, the method 700 may return to 714 for further data collection.

E. Further Discussion

As will be apparent from this disclosure, example embodiments may comprise various useful features and aspects, one example of which is leveraging part of a DANN network already trained by the adaptation process. In particular, Domain Adaptation (DA) is a type of Transfer Learning (TL) where the source and target tasks are the same, with a shift between source and target domain distributions. Domain Adversarial Neural Networks (DANN) is a type of neural network formed by three parts: a feature extractor, a domain classifier and a label predictor. Example embodiments of the invention embrace a method for leveraging part of the DANN model, namely, a domain classifier, to identify changes in the application domain.

Another example feature that may be implemented by example embodiments is a lightweight framework for detecting if the application domain has changed. Particularly, example embodiments may provide a framework for detecting if the application domain has changed during the execution of a domain adaptation system.

A final example feature of some embodiments is the ability to detect the underlying differences between two image datasets. Particularly, images may have structured elements, making them difficult to be easily compared with other images. Typically, datasets are compared by using probabilistic distributions of the data, which is difficult for image datasets. Thus, example embodiments of the invention may provide a method for determining if two datasets of images are different, without the use of probabilistic distributions.

F. Further Example Embodiments

Following are some further example embodiments of the invention. These are presented only by way of example and are not intended to limit the scope of the invention in any way.

Embodiment 1. A method, comprising: gathering, by a domain adversarial neural network model deployed in an autonomous vehicle operating in a domain, a dataset that comprises unsegmented and unlabeled image data about the domain; sampling the dataset to create an adapted domain dataset; detaching a domain classifier from the domain adversarial neural network; using the domain classifier as a domain change detector model to predict a class of the unsegmented and unlabeled image data in the adapted domain dataset; and based on the class, either: determining that the domain is changed or is unknown; or determining that the domain has not changed.

Embodiment 2. The method as recited in embodiment 1, wherein using the domain change detector model to predict a class of the unsegmented and unlabeled image data in the adapted domain dataset comprises comparing, with the domain change detector model, the image data of the adapted domain dataset with image data of an original domain dataset.

Embodiment 3. The method as recited in embodiment 2, wherein the original domain dataset comprises labeled data about the domain as the domain existed prior to gathering of the dataset by the autonomous vehicle.

Embodiment 4. The method as recited in any of embodiments 1-3, wherein using the domain classifier as a domain change detector model to predict a class of the unsegmented and unlabeled image data comprises generating, with the domain change detector model, a p value for the unsegmented and unlabeled image data Embodiment 5. The method as recited in embodiment 4, wherein when the p value is less than or equal to a minimum threshold, the unsegmented and unlabeled image data is the same or similar to data of an original domain dataset, and when the p value equals or exceeds a maximum threshold, the domain has not changed.

Embodiment 6. The method as recited in embodiment 4, wherein when the p value is between a minimum threshold and a maximum threshold, the domain is changed or unknown.

Embodiment 7. The method as recited in embodiment 6, wherein when the domain is changed or unknown, an adaptation procedure is instantiated that comprises: sampling and updating the adapted domain dataset; detaching the domain classifier; and retraining the domain change detector model for e epochs using the adapted domain dataset, as updated.

Embodiment 8. The method as recited in any of embodiments 1-7, wherein the retraining is performed at the autonomous vehicle.

Embodiment 9. The method as recited in any of embodiments 1-8, wherein the dataset is gathered using one or more devices, and the one or more devices comprise a camera and/or a video camera.

Embodiment 10. The method as recited in any of embodiments 1-9, wherein using the domain classifier as a domain change detector model to predict a class of the unsegmented and unlabeled image data is performed at the autonomous vehicle.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
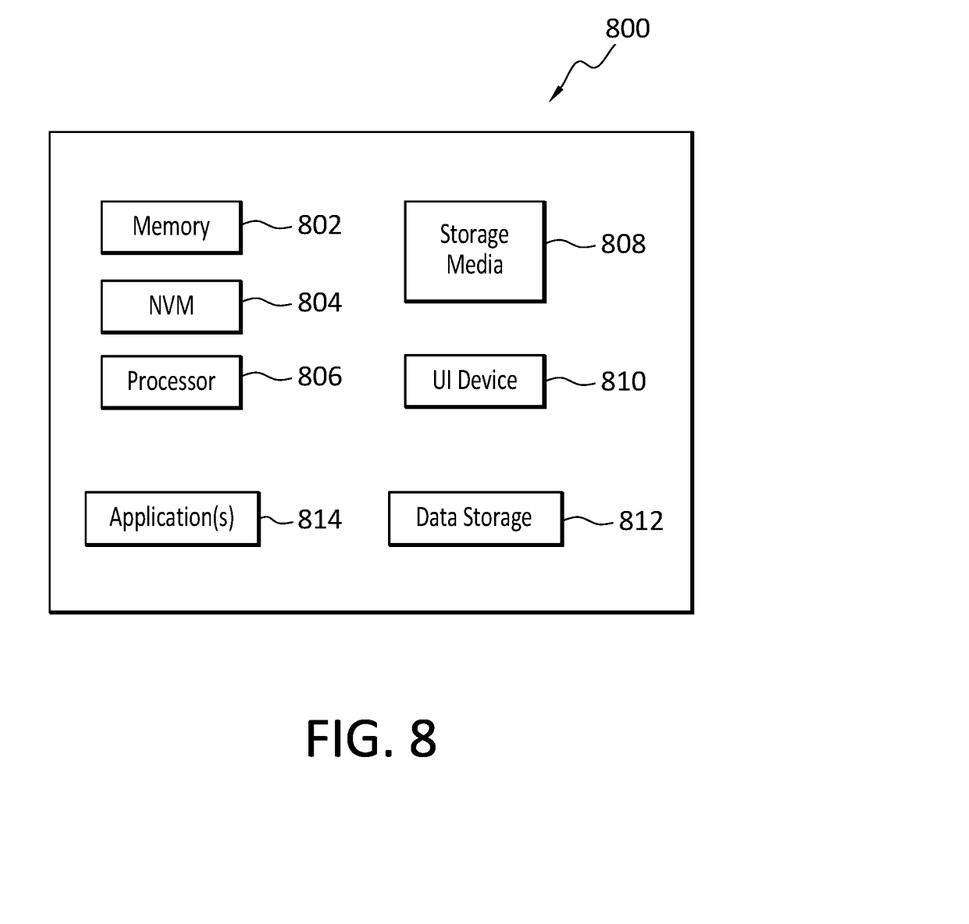
FIG. 8 discloses a computing entity operable to perform any of the disclosed methods, processes, and operations.

With reference briefly now to FIG. 8, any one or more of the entities disclosed, or implied, by FIGS. 1-7 and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 801, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   gathering, by a domain adversarial neural network model deployed in an autonomous vehicle operating in a domain, a dataset that comprises unsegmented and unlabeled image data about the domain;
   sampling the dataset to create an adapted domain dataset;
   detaching a domain classifier from the domain adversarial neural network;
   using the domain classifier as a domain change detector model to predict a class of the unsegmented and unlabeled image data in the adapted domain dataset; and
   based on the class, either:
      determining that the domain is changed or is unknown; or
      determining that the domain has not changed.

2. The method as recited in claim 1, wherein using the domain change detector model to predict a class of the unsegmented and unlabeled image data in the adapted domain dataset comprises comparing, with the domain change detector model, the image data of the adapted domain dataset with image data of an original domain dataset.

3. The method as recited in claim 2, wherein the original domain dataset comprises labeled data about the domain as the domain existed prior to gathering of the dataset by the autonomous vehicle.

4. The method as recited in claim 1, wherein using the domain classifier as a domain change detector model to predict a class of the unsegmented and unlabeled image data comprises generating, with the domain change detector model, a p value for the unsegmented and unlabeled image data.

5. The method as recited in claim 4, wherein when the p value is less than or equal to a minimum threshold, the unsegmented and unlabeled image data is the same or similar to data of an original domain dataset, and when the p value equals or exceeds a maximum threshold, the domain has not changed.

6. The method as recited in claim 4, wherein when the p value is between a minimum threshold and a maximum threshold, the domain is changed or unknown.

7. The method as recited in claim 6, wherein when the domain is changed or unknown, an adaptation procedure is instantiated that comprises:
   sampling and updating the adapted domain dataset;
   detaching the domain classifier; and
   retraining the domain change detector model for e epochs using the adapted domain dataset, as updated.

8. The method as recited in claim 1, wherein the retraining is performed at the autonomous vehicle.

9. The method as recited in claim 1, wherein the dataset is gathered using one or more devices, and the one or more devices comprise a camera and/or a video camera.

10. The method as recited in claim 1, wherein using the domain classifier as a domain change detector model to predict a class of the unsegmented and unlabeled image data is performed at the autonomous vehicle.

11. A computer readable storage medium having stored therein instructions that are executable by one or more hardware processors to perform operations comprising:
   gathering, by a domain adversarial neural network model deployed in an autonomous vehicle operating in a domain, a dataset that comprises unsegmented and unlabeled image data about the domain;
   sampling the dataset to create an adapted domain dataset;
   detaching a domain classifier from the domain adversarial neural network;
   using the domain classifier as a domain change detector model to predict a class of the unsegmented and unlabeled image data in the adapted domain dataset; and
   based on the class, either:
      determining that the domain is changed or is unknown; or
      determining that the domain has not changed.

12. The computer readable storage medium as recited in claim 11, wherein using the domain change detector model to predict a class of the unsegmented and unlabeled image data in the adapted domain dataset comprises comparing, with the domain change detector model, the image data of the adapted domain dataset with image data of an original domain dataset.

13. The computer readable storage medium as recited in claim 12, wherein the original domain dataset comprises labeled data about the domain as the domain existed prior to gathering of the dataset by the autonomous vehicle.

14. The computer readable storage medium as recited in claim 11, wherein using the domain classifier as a domain change detector model to predict a class of the unsegmented and unlabeled image data comprises generating, with the domain change detector model, a p value for the unsegmented and unlabeled image data.

15. The computer readable storage medium as recited in claim 14, wherein when the p value is less than or equal to a minimum threshold, the unsegmented and unlabeled image data is the same or similar to data of an original domain dataset, and when the p value equals or exceeds a maximum threshold, the domain has not changed.

16. The computer readable storage medium as recited in claim 14, wherein when the p value is between a minimum threshold and a maximum threshold, the domain is changed or unknown.

17. The computer readable storage medium as recited in claim 16, wherein when the domain is changed or unknown, an adaptation procedure is instantiated that comprises:
- sampling and updating the adapted domain dataset;
- detaching the domain classifier; and
- retraining the domain change detector model for e epochs using the adapted domain dataset, as updated.

18. The computer readable storage medium as recited in claim 11, wherein the retraining is performed at the autonomous vehicle.

19. The computer readable storage medium as recited in claim 11, wherein the dataset is gathered using one or more devices, and the one or more devices comprise a camera and/or a video camera.

20. The computer readable storage medium as recited in claim 11, wherein using the domain classifier as a domain change detector model to predict a class of the unsegmented and unlabeled image data is performed at the autonomous vehicle.

* * * * *